United States Patent
Gotkin

(10) Patent No.: US 10,744,401 B2
(45) Date of Patent: *Aug. 18, 2020

(54) FANTASY SPORTS TEAM LEAGUE

(71) Applicant: Steven Gotkin, Las Vegas, NV (US)

(72) Inventor: Steven Gotkin, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 16/226,736

(22) Filed: Dec. 20, 2018

(65) Prior Publication Data

US 2019/0118077 A1     Apr. 25, 2019

Related U.S. Application Data

(63) Continuation of application No. 15/174,378, filed on Jun. 6, 2016, now Pat. No. 10,159,893.

(60) Provisional application No. 62/170,859, filed on Jun. 4, 2015.

(51) Int. Cl.
*A63F 13/828* (2014.01)
*A63F 13/00* (2014.01)

(52) U.S. Cl.
CPC .................................. *A63F 13/00* (2013.01)

(58) Field of Classification Search
CPC ........................................................ A63F 13/828
See application file for complete search history.

(56) References Cited

U.S. PATENT DOCUMENTS

| | | |
|---|---|---|
| 8,460,110 B2 | 6/2013 | Costin et al. |
| 2002/0115488 A1 | 8/2002 | Berry et al. |
| 2004/0266530 A1 | 12/2004 | Bishop |
| 2009/0181738 A1 | 7/2009 | Costin et al. |
| 2010/0197374 A1 | 8/2010 | Koivisto |
| 2011/0028195 A1 | 2/2011 | Pennington et al. |
| 2011/0183734 A1 | 7/2011 | Koivisto et al. |
| 2012/0046095 A1 | 2/2012 | Shore |
| 2013/0045805 A1 | 2/2013 | Pennington et al. |
| 2013/0079073 A1 | 3/2013 | Sharifi |

*Primary Examiner* — Omkar A Deodhar
(74) *Attorney, Agent, or Firm* — Nixon & Vanderhye P.C.

(57) ABSTRACT

In a fantasy sports team league, a player salary cap is established and a draft is conducted by enabling players to select teams or team characteristics from a list of game matchups. Each team or team characteristic is assigned a cost and a point value based on each team's chance of winning. The players are required to keep a total cost of the selected teams below the player salary cap. After the game matchups have been played, the point value for each winning team or team characteristic selected by each of the players is awarded.

1 Claim, 7 Drawing Sheets

| GAME DATE | VISITOR CHANCE OF WINNING | VISITOR COST | POSSIBLE VISITOR POINTS | VISITOR | HOME | POSSIBLE HOME POINTS | HOME COST | HOME CHANCE OF WINNING |
|---|---|---|---|---|---|---|---|---|
| 11/15/14 | 21.28% | $100 | 370 | Kentucky | Tennessee | 100 | $370 | 78.72% |
| 11/15/14 | 24.10% | $100 | 315 | Mississippi St | Alabama | 100 | $315 | 75.90% |
| 11/15/14 | 29.41% | $100 | 240 | South Carolina | Florida | 100 | $240 | 70.59% |
| 11/15/14 | 37.74% | $100 | 165 | Missouri | Texas A&M | 100 | $165 | 62.26% |
| 11/15/14 | 43.48% | $100 | 130 | Auburn | Georgia | 100 | $130 | 56.52% |
| 11/15/14 | 46.08% | $100 | 117 | LSU | Arkansas | 100 | $117 | 53.92% |

| GAME DATE | VISITOR CHANCE OF WINNING | VISITOR COST | POSSIBLE VISITOR POINTS | VISITOR | HOME | POSSIBLE HOME POINTS | HOME COST | HOME CHANCE OF WINNING |
|---|---|---|---|---|---|---|---|---|
| 11/15/14 | 21.28% | $100 | 370 | Kentucky | Tennessee | 100 | $370 | 78.72% |
| 11/15/14 | 24.10% | $100 | 315 | Mississippi St | Alabama | 100 | $315 | 75.90% |
| 11/15/14 | 29.41% | $100 | 240 | South Carolina | Florida | 100 | $240 | 70.59% |
| 11/15/14 | 37.74% | $100 | 165 | Missouri | Texas A&M | 100 | $165 | 62.26% |
| 11/15/14 | 43.48% | $100 | 130 | Auburn | Georgia | 100 | $130 | 56.52% |
| 11/15/14 | 46.08% | $100 | 117 | LSU | Arkansas | 100 | $117 | 53.92% |

FIG. 1

| CHARLIE'S ROSTER | COST | JONAH'S ROSTER | COST |
|---|---|---|---|
| Tennessee | $370 | Florida | $240 |
| Alabama | $315 | Texas A&M | $165 |
| Missouri | $100 | Georgia | $130 |
| LSU | $100 | Arkansas | $117 |
| | | Mississippi St | $100 |
| | | Kentucky | $100 |

FIG. 2

| CHARLIE'S ROSTER | POINTS WON |
|---|---|
| Tennessee | 100 |
| Alabama | 100 |
| Missouri | 165 |
| LSU | 0 |

| JONAH'S ROSTER | POINTS WON |
|---|---|
| Florida | 0 |
| Texas A&M | 0 |
| Georgia | 100 |
| Arkansas | 100 |
| Mississippi St | 0 |
| Kentucky | 0 |

| TEAM | PROJECTED WINS | COST |
|---|---|---|
| Arizona Diamondbacks | 82 | $8,200 |
| Atlanta Braves | 87.5 | $8,750 |
| Baltimore Orioles | 77.5 | $7,750 |
| Boston Red Sox | 82.5 | $8,250 |
| Chicago Cubs | 73 | $7,300 |
| Chicago White Sox | 80.5 | $8,050 |
| Cincinnati Reds | 91.5 | $9,150 |
| Cleveland Indians | 76.5 | $7,650 |
| Colorado Rockies | 70.5 | $7,050 |
| Detroit Tigers | 93 | $9,300 |
| Miami Marlins | 64 | $6,400 |
| Houston Astros | 59.5 | $5,950 |
| Kansas City Royals | 77.5 | $7,750 |
| Los Angeles Angels | 92 | $9,200 |

FIG. 4B

| Los Angeles Dodgers | 91.5 | $9,150 |
|---|---|---|
| Milwaukee Brewers | 81.5 | $8,150 |
| Minnesota Twins | 67 | $6,700 |
| New York Mets | 74.5 | $7,450 |
| New York Yankees | 88.5 | $8,850 |
| Oakland A's | 83.5 | $8,350 |
| Philadelphia Phillies | 82.5 | $8,250 |
| Pittsburgh Pirates | 77 | $7,700 |
| San Diego Padres | 75 | $7,500 |
| San Francisco Giants | 88 | $8,800 |
| Seattle Mariners | 78.5 | $7,850 |
| St Louis Cardinals | 84 | $8,400 |
| Tampa Bay Rays | 85.5 | $8,550 |
| Texas Rangers | 86 | $8,600 |
| Toronto Blue Jays | 87.5 | $8,750 |
| Washington Nationals | 92 | $9,200 |

| BEN'S ROSTER | COST | SAM'S ROSTER | COST | DAVE'S ROSTER | COST | CASEY'S ROSTER | COST |
|---|---|---|---|---|---|---|---|
| Texas Rangers | $8,600 | Detroit Tigers | | | | Chicago Cubs | $7,300 |
| Miami Marlins | $6,400 | Los Angeles Angels | $9,300 | Washington Nationals | $9,200 | New York Mets | $7,450 |
| Minnesota Twins | $6,700 | San Francisco Giants | $9,200 | Cincinnati Reds | $9,150 | San Diego Padres | $7,500 |
| Colorado Rockies | $7,050 | Atlanta Braves | $8,800 | Toronto Blue Jays | $8,750 | Cleveland Indians | $7,650 |
| New York Yankees | $8,850 | | $8,750 | Los Angeles Dodgers | $9,150 | Baltimore Orioles | $7,750 |
| | $37,600 | | $36,050 | | $36,250 | | $37,650 |

FIG. 5

| BEN'S ROSTER | POINTS WON | SAM'S ROSTER | POINTS WON | DAVE'S ROSTER | POINTS WON | CASEY'S ROSTER | POINTS WON |
|---|---|---|---|---|---|---|---|
| Texas Rangers | 91 | Detroit Tigers | 93 | Washington Nationals | 86 | Chicago Cubs | 66 |
| Miami Marlins | 62 | Los Angeles Angels | 78 | Cincinnati Reds | 90 | New York Mets | 74 |
| Minnesota Twins | 66 | San Francisco Giants | 76 | Toronto Blue Jays | 74 | San Diego Padres | 76 |
| Colorado Rockies | 74 | Atlanta Braves | 96 | Los Angeles Dodgers | 92 | Cleveland Indians | 92 |
| New York Yankees | 85 | | | | | Baltimore Orioles | 85 |
| | 378 | | 343 | | 342 | | 393 |

FIG. 6

FANTASY SPORTS TEAM LEAGUE

CROSS-REFERENCES TO RELATED APPLICATIONS

This application is a continuation of U.S. patent application Ser. No. 15/174,378 filed Jun. 6, 2016, pending, which claims the benefit of U.S. Provisional Patent Application Ser. No. 62/170,859, filed Jun. 4, 2015, the entire content of each of which is herein incorporated by reference.

STATEMENT REGARDING FEDERALLY SPONSORED RESEARCH OR DEVELOPMENT (NOT APPLICABLE)

BACKGROUND AND SUMMARY

The invention relates to a fantasy sports team league (FSTL) where multiple teams are drafted to be on the FSTL player's "roster" for the day, week, or season.

This FSTL is team-centered, as opposed to leagues that focus on the performance of individual players. Since many sports leagues have many teams (e.g. college football currently has 128 in the FBS alone, Division I college basketball has 350 teams, etc.), and because the players in leagues like college football and college basketball are so numerous (FBS college football has around 15,000 players while Division I college basketball has over 5,000), and since teams can change drastically from year-to-year, it is often too difficult for the average FSTL player to come to well-reasoned predictions about individual players—especially those playing for teams outside of the FSTL player's sphere of interest (e.g. his/her local team, conference preference, alma mater, etc.). Therefore, instead of haphazardly selecting individual players, FSTL players can utilize team research to build a fantasy roster of entire teams to compete against the rosters of opposing FSTL players.

In an exemplary embodiment, a method of administering a fantasy sports team league includes the steps of (a) establishing a player salary cap; (b) conducting a draft by enabling players to select teams or team characteristics from a list of game matchups, each team or team characteristic being assigned a cost and a point value based on each team's chance of winning, wherein the players are required to keep a total cost of the selected teams below the player salary cap; and (c) after the game matchups have been played, awarding the point value to the players for each winning team or team characteristic selected by each of the players.

Step (a) may be practiced based on a number of team or team characteristic offerings and the cost of each team or team characteristic. In step (b), the cost and point value for each team or characteristic may be dependent on the team's or characteristic's chance of winning. In this context, the method may also include determining the team's chance of winning by using moneyline odds at a specific time before the draft, removing a vigorish added in the moneylines to arrive at a result, and converting the result to a percentage. The team characteristics may comprise at least one of a team's offense and a team's defense. Steps (a)-(c) may be practiced weekly over an entire season, and the method may further include the step of determining the fantasy sports team league winner based on points accumulated over the entire season. The team characteristics may include a number of wins over an entire season, where the cost and point value for each team may be determined according to a number of games each team may be projected to win.

In another exemplary embodiment, a computer system for administering a fantasy sports team league includes at least one user computer running a computer program that requests and processes information according to registration information input by a player; and a system server running a server program, where the at least one user computer and the system server are interconnected by a computer network. The system server administers the fantasy sports team league by (a) establishing a player salary cap, (b) in conjunction with the at least one user computer, conducting a draft by enabling players to select teams or team characteristics from a list of game matchups, each team or team characteristic being assigned a cost and a point value based on each team's chance of winning, where the players are required to keep a total cost of the selected teams below the player salary cap, and (c) after the game matchups have been played, the system server awarding the point value to the players for each winning team or team characteristic selected by each of the players.

In another exemplary embodiment, a computer program is embodied on a computer-readable medium for administering the fantasy sports team league.

BRIEF DESCRIPTION OF THE DRAWINGS

These and other aspects and advantages will be described in detail with reference to the accompanying drawings, in which:

FIG. 1 is an exemplary chart of weekly matchups;
FIG. 2 is a chart showing exemplary player rosters;
FIG. 3 shows charts with exemplary results after the matchups are completed;
FIGS. 4A and 4B show teams and projected wins for a season-long major-league baseball contest;
FIGS. 5 and 6 show exemplary rosters and results, respectively, for the season-long major league baseball contest.

DETAILED DESCRIPTION OF THE INVENTION

Figure 7:
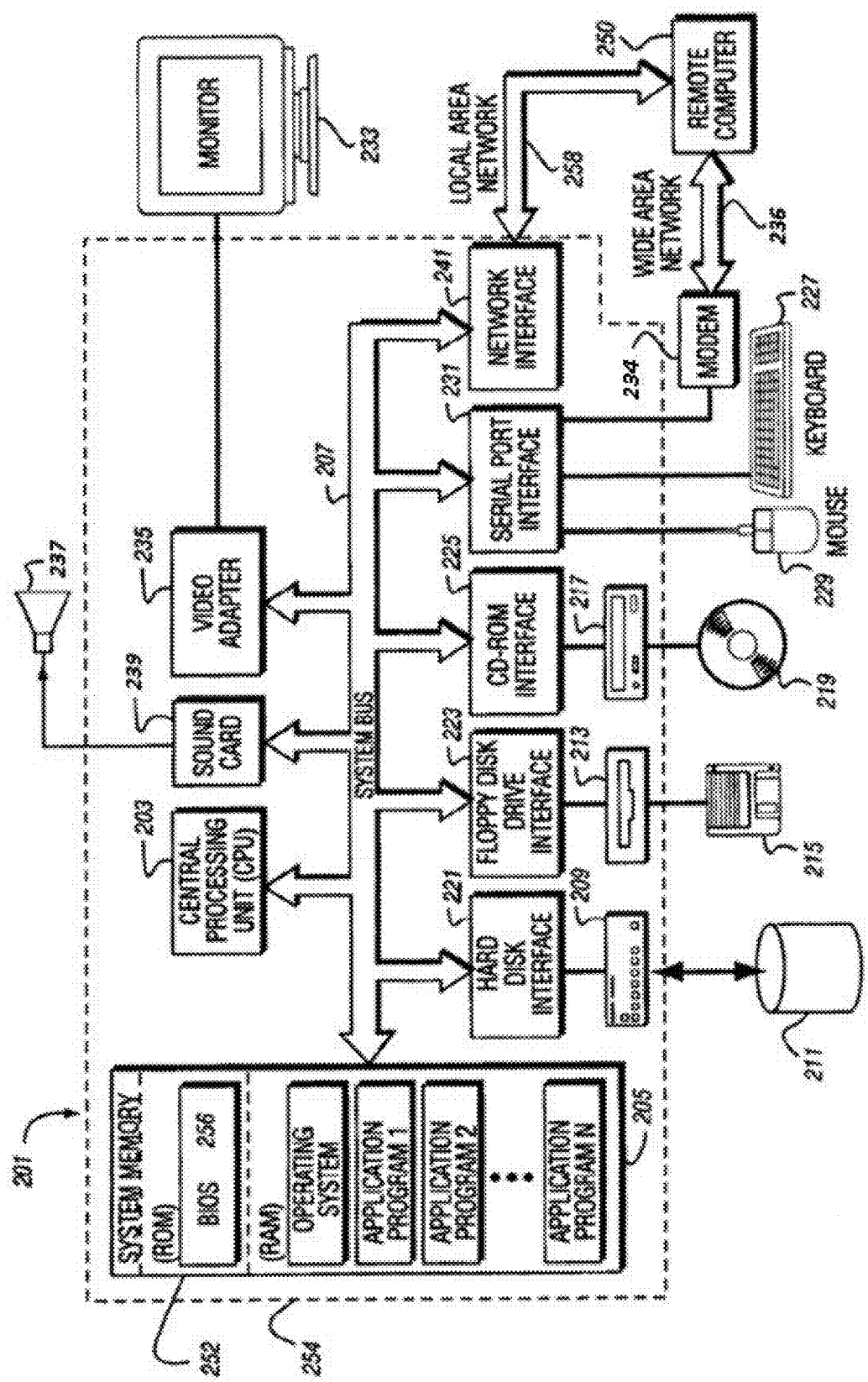
FIG. 7 is a schematic diagram of an exemplary computer system.

After registration and (possibly) payment are verified, the FSTL player is logged-in to his/her personal dashboard. The dashboard contains account settings, notifications, history, etc. Among other things, it allows for username and password changes, displays league(s) status, provides notifications, allows for team/FSTL player customization (logos, avatars, colors, etc.), allows for changes to payment options, allows for the filtering/searching for upcoming games, etc.

When entering a contest, the FSTL player selects the type of play (free or money—at tiered levels of entry fee and prizes awarded), the league (conference, inter-conference, national, etc.), the number of FSTL players (tournament, head-to-head, three-player, four-player, etc.) and its duration: daily, weekly, or season-long.

In the case of a money league, the FSTL player pays the entry fee for the given contest.

Draft Procedures

Depending on the contest, a "salary cap" is provided. It is the same for every FSTL player in the given contest, and the amount is dependent on the number of team offerings and the cost of each team (which is dependent upon the likelihood of each team winning its matchup, unless it is a season-long contest). After a contest is filled, the draft will begin at its designated time. There will be options for auto-drafting specifications. Draft order is assigned randomly. Each FSTL player takes it in turn to "draft" one team at a time. The participants will see all the matchups for their contest. The matchups will contain teams with their likelihood of winning the game. The likelihood (i.e. the probability of victory) may be determined using any suitable methodology, which may be dependent on the sport. An exemplary "Chance of Winning" for college football may be determined by taking "moneyline" odds (at a specific point in time before the draft), removing the vigorish that is added to the moneylines, and then converting that number to a percentage. The sum of the "Chance of Winning" percentages for opposing teams in a single matchup (when the outcome is binary: winning or losing) is 100%. The amount paid for each team will depend on that team's likelihood of winning the game. The amount of contest points won for each team's victory will also be dependent on the team's likelihood of winning the game. For example, a college football head-to-head (two-player) weeklong Southeastern Conference contest might see the following rules and the chart of FIG. 1:

RULES: (1) EACH PLAYER MUST CHOOSE AT LEAST FOUR TEAMS; (2) NO FSTL PLAYER CAN CHOOSE BOTH TEAMS INVOLVED IN A SINGLE MATCHUP (i.e. both sides of a game); (3) THE SALARY CAP IS $950; (4) TIES ARE BROKEN: FIRST, BY NUMBER OF VICTORIES; SECOND, BY REMAINING MONEY (under the salary cap).

(In addition to the data in FIG. 1, research on each team's performance will be available, as well as the option to see expert assessments of each team, matchup, etc.)

The team less likely to win the game always costs $100 against the salary cap, but if they win, the FSTL player is rewarded with more contest points.

Continuing this example, two FSTL players, Charlie and Jonah, are playing head-to-head. See FIG. 2. For his four teams, Charlie paid $885. He was $65 under his salary cap. For his six teams, Jonah paid $852. He was $98 under his salary cap. The results are shown in FIG. 3.

Charlie won the contest, since his roster of schools accumulated 365 points, while Jonah's roster accumulated 200 contest points. Therefore, Charlie would receive his contest prize winnings automatically, and he would be able to view and access those winnings through his dashboard.

One alternative to the basic format (outlined above) would be the drafting of statistical categories for entire teams. For example, a FSTL player would pay for Alabama's rushing offense, Washington State's passing offense, TCU's rush defense, Ohio State's passing defense, UCLA's placekicking, etc.

No matter the alternative, the concept of drafting the performance of an entire team (rather than individuals on those teams) remains constant.

The use of betting data (i.e. moneyline odds, futures bets (for things like season win totals), proposition bets (for things like rushing yards, home runs, three-pointers, etc.)) to convert to fantasy sports winning percentages and (therefore,) prices is equally significant to the team aspect of the described embodiments. The methodology uses betting data (without the vigorish) to calculate all probabilities/likelihoods of any (winning) outcome.

Another example of how this method of betting data conversion might work for team characteristics is:

Alabama: (1) will rush for over 150 yards—Cost $400 to win $100; or (2) will not rush for over 150 yards—Cost $100 to win $400.

Clemson: (1) will rush for over 200 yards—Cost $300 to win $100; or (2) will not rush for over 200 yards—Cost $100 to win $300.

In this instance, fantasy sports players are "drafting" team statistical scenarios like total number of rushing yards (or runs to be scored, three-pointers to be made, etc.). In every case, the potential win percentage and, therefore, the prices, would be determined by vigorish-less betting data.

Season-Long Contests

Version 1: A season-long college football contest would follow the same format as the above example with the only difference being that teams are drafted anew each week. The FSTL players carry their cumulative contest point-totals with them from week to week. At the end of the entire season, the contest winner is determined by the greatest total number of contest points won for all weeks combined. This version can be played with or without the ability to carry over remaining salary cap money from the previous week(s) to the current weekly draft.

Version 2: Drafting teams that earn contest points for every win. Team price is based on predetermined, projected team-win totals: the more wins a team is projected to win, the more expensive the team. For example, a four-player regular season-long major league baseball contest might see the following rules and the charts in FIGS. 4A and 4B:

RULES: (1) EACH PLAYER MUST CHOOSE AT LEAST FOUR TEAMS; (2) NO TEAM CAN BE DRAFTED BY MORE THAN ONE FSTL PLAYER; (3) THE SALARY CAP IS $38,000; (4) TIES ARE BROKEN BY REMAINING MONEY (under the salary cap).

(In addition to the data shown in FIGS. 4A and 4B, for each team, research, expert assessments, etc., will be available.)

Continuing this example, four FSTL players, Ben, Sam, Dave, and Casey are playing in a season-long contest (see FIG. 5). Ben was $400 under the salary cap. Sam was $1,950 under the salary cap. Dave was $1,750 under the salary cap. Casey was $350 under the salary cap. The results are shown in FIG. 6.

Casey won the contest, since his roster of teams accumulated 393 points. At the season's conclusion, Casey would receive his contest prize winnings automatically, and he would be able to view and access those winnings through his dashboard.

Both season-long versions (or multi-week versions) allow for a variety of tournament play. For instance, 8, 16, 32, etc. FSTL players can be randomly placed in brackets going head-to-head in pairs as they win their way through the brackets over a designated period of time (ranging from multiple days to season-long) until one champion is left standing.

All formats are applicable to all sports.

The administration of a fantasy sports team league described with reference to FIGS. 1-6 is preferably a browser-based system in which a program running on a user's computer (the user's web browser) requests information from a server program running on a system server. The system server sends the requested data back to the browser program, and the browser program then interprets and displays the data on the user's computer screen. The process is as follows:

1. The user runs a web browser program on his/her computer or an app on a wireless device.

2. The user connects to the server computer (e.g., via the Internet). Connection to the server computer may be conditioned upon the correct entry of a password as is well known.

3. The user requests a page from the server computer. The user's browser sends a message to the server computer that includes the following:
 the transfer protocol (e.g., http://); and
 the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the account management system of the present invention include Mozilla Firefox® and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the system described below and illustrated in the accompanying drawings.

FIG. 7 generally illustrates a computer system 201 suitable for use as the client and server components of the described system. The computer system 201 may be embodied in the form of a desktop or laptop computer or alternatively in the form of a wireless handheld device such as a smartphone, tablet or the like. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252.

Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235. In addition, a speaker 237 or other type of audio output device is connected to the system bus 207 via an audio interface, such as a sound card 239.

The computer system 201 may also include a modem or broadband or wireless adapter 234 or other means for establishing communications over the wide area network 236, such as the Internet. The modem 234, which may be internal or external, is connected to the system bus 207 via the serial port interface 231. A network interface 241 may also be provided for allowing the computer system 201 to communicate with a remote computing device 250 via a local area network 258 (or such communication may be via the wide area network 236 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used, and the invention is not limited in this respect.

The method and system of the described embodiments may be implemented using a flexible, self-referential table that stores data. The table may store any type of data, both structured and unstructured, and provides an interface to other application programs. The table may include a plurality of rows and columns, where each row has an object identification number (OID), and each column also has an OID. A row corresponds to a record and a column corresponds to a field such that the intersection of a row and a column may comprise a cell that may contain data for a particular record related to a particular field. An exemplary self-referential table is described in U.S. Pat. No. 6,151,604, the contents of which are hereby incorporated by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of administering a fantasy sports team league, the method comprising:
   (a) establishing a player salary cap;
   (b) conducting a draft by enabling players to select teams or team characteristics from a list of game matchups, each team or team characteristic being assigned a cost and a point value based on each team's chance of winning, wherein the players are required to keep a total cost of the selected teams below the player salary cap; and
   (c) after the game matchups have been played, awarding the point value to the players for each winning team or team characteristic selected by each of the players,
   wherein in step (b), the cost and point value for each team or characteristic is dependent on the team's or characteristic's chance of winning, and wherein each team's or characteristic's chance of winning is determined by using available data before the draft, removing any vigorish added in the available data to arrive at a result, and converting the result to a percentage.

* * * * *